(12) United States Patent
Kanda et al.

(10) Patent No.: US 7,151,877 B2
(45) Date of Patent: Dec. 19, 2006

(54) OPTICAL FIBER AXIAL ALIGNMENT METHOD AND RELATED DEVICE, AND OPTICAL FIBER FUSION SPLICING METHOD AND RELATED DEVICE

(75) Inventors: Yoshiharu Kanda, Chiba (JP); Kenji Takahashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 202 days.

(21) Appl. No.: 10/660,691

(22) Filed: Sep. 12, 2003

(65) Prior Publication Data
US 2004/0067026 A1 Apr. 8, 2004

(30) Foreign Application Priority Data
Oct. 8, 2002 (JP) .............................. 2002-295120
Mar. 3, 2003 (JP) .............................. 2003-055753

(51) Int. Cl.
*G02B 6/26* (2006.01)
*G02B 6/00* (2006.01)

(52) U.S. Cl. .......................... 385/52; 385/137; 385/95; 385/96; 385/97; 385/98

(58) Field of Classification Search ............ 385/95–99, 385/52, 134–137
See application file for complete search history.

(56) References Cited

U.S. PATENT DOCUMENTS

| 4,102,717 A | | 7/1978 | Hensel | |
| 4,812,010 A | * | 3/1989 | Osaka et al. | 385/96 |
| 5,570,446 A | * | 10/1996 | Zheng et al. | 385/98 |
| 6,034,718 A | * | 3/2000 | Hattori | 348/61 |

FOREIGN PATENT DOCUMENTS

| EP | 0 278 423 | | 8/1988 |
| EP | 1 174 744 | | 1/2002 |
| JP | 59-118 | | 1/1984 |
| JP | 59-2013 | | 1/1984 |
| JP | 61-112106 | | 5/1986 |
| JP | 61 112106 | * | 5/1986 |
| JP | 62-210406 | | 9/1987 |
| JP | 1-160405 | | 11/1989 |
| JP | 5-188243 | | 7/1993 |
| JP | 9-68622 | | 3/1997 |
| JP | 2000-275462 | | 10/2000 |

* cited by examiner

*Primary Examiner*—Frank G. Font
*Assistant Examiner*—Michael P. Mooney
(74) *Attorney, Agent, or Firm*—Oblon, Spivak, McClelland, Maier & Neustadt, P.C.

(57) ABSTRACT

An optical fiber axial alignment method and related method, and an optical fiber fusion splicing method and related device are disclosed wherein a butt alignment section 9 has a butt alignment groove portion 7 to allow at least one pair of optical fibers 3 to be positioned such that distal ends of optical fibers 3 mutually but one another. Optical fiber guide sections 21 on both sides of the butt alignment section 9 have guide grooves 23, whose centers are positioned on substantially straight lines interconnecting centers of at least one pair of opposing butt alignment groove portions formed on the butt alignment section 9, and are able to elevate above the butt alignment section 9. When fusion splicing at least one pair of the optical fibers 3, the optical fiber guide sections 21 are elevated above the butt alignment groove portions 7 to allow the optical guides 3 to be received in the guide grooves 23 whereupon the optical guide sections 21 are lowered to cause the distal ends of the optical fibers 3 to be automatically received in the butt alignment groove portions 7.

22 Claims, 8 Drawing Sheets

OPTICAL FIBER AXIAL ALIGNMENT METHOD AND RELATED DEVICE, AND OPTICAL FIBER FUSION SPLICING METHOD AND RELATED DEVICE

BACKGROUND OF THE INVENTION

1. Field of the Invention

The present invention relates to an optical fiber axial alignment method and related method for axially aligning one pair of or plural pairs of optical fibers with respect to one another, and an optical fiber fusion splicing method and related device wherein the one pair of or the plural pairs of opposing optical fibers, that are axially aligned, are mutually fusion spliced.

2. Description of the Related Art

FIG. 1 shows one embodiment of a related art optical fiber axial alignment and fusion splicing device 101 (hereinafter referred to as "a first related art"). The optical fiber axial alignment and fusion splicing device 101 is comprised of butt alignment sections 109 having butt alignment V-shaped groove portions 107, respectively, that during positioning of a pair of tape core wires, the tape core wires 105 are caused to butt each other from right and left of the optical fiber axial alignment and fusion splicing device 101, and a pair of optical fiber holder sections 111 (optical fiber holders) that clamp the pair of tape core wires 105, respectively. Also, although each V-shaped groove portion 107 may be suffice to have at least one groove 107a, since the example of FIG. 1 shows a case where use is made for tape type optical fiber core wires 105 each composed of a plurality of optical fibers 103, butt alignment groove portions 107 are shown as having a plurality of grooves 107a, respectively.

When placing the respective optical fibers 103, that form component elements of the pair of tape core wires 105, on the respective grooves 107a of the respective V-shaped groove portions 107, optical fiber holder sections 111, that clamp the respective optical fibers 103 or the tape core wires 105, are manually shifted, thereby causing the optical fibers 105 to be positioned on the associated V-shaped groove portions 107. When using the optical fiber holder sections 111, a worker uses his one hand to move the optical fiber holder section 111 so as to allow all of the optical fibers 103 to be received in the associated grooves 107a of the V-shaped groove section 107 and, if the respective optical fibers 103 are received in the respective grooves 107a, as shown in FIGS. 2 and 3, the worker uses the other hand to operate a clamp lever 113 from a condition shown in a dotted line to a condition shown in a solid line, thereby clamping the tape core wire 105 with the optical fiber holder section 111.

A bottom wall 111a of the optical fiber holder section 111 has a substantially reversed concave shape. Meanwhile, a holder section pedestal 115, on which the optical fiber holder section 111 is rested, has its upper surface formed with a convex portion 115a. A slight degree of gap exists between the convex portion 115a and the bottom wall 111a and moving the optical fiber holder section 111 enables the optical fibers 103 to be precisely positioned in the grooves 107a of the V-shaped groove portion 103.

Further, another related art optical fiber axial alignment and fusion splicing device (hereinafter referred to as "a second related art") has the same V-shaped grooves as those of the first related art set forth above and has the same number of slits, as those of the V-shaped grooves, that protrude above the V-shaped grooves and are fixed rearward of the V-shaped grooves, with the slits and the V-shaped grooves being aligned on the same straight lines. Accordingly, inserting the optical fibers through the slits allows the respective optical fibers to be guided through the slits to fall in parallel to one another and, thus, the optical fibers are easily received in the V-shaped grooves, respectively.

However, with the first related art optical fiber axial alignment and fusion splicing device 101, a distance between the adjacent V-shaped grooves 107 is extremely small to be 0.3 mm and, also, a width of the V-shaped groove 107 per se is extremely narrow to be 0.1 mm. Under such conditions, since the worker needs to carry out positioning between the V-shaped grooves 107 and the optical fibers 103 through hand work, resulting in troublesome issues.

Furthermore, when clamping the optical fibers 103 with the optical fiber holder sections 111, the existence of the gap between the holder section 111 and the pedestal 115 results in movement of the optical fiber holder section 111 to cause the optical fibers 103 to be liable to be deviated from the given grooves 107a, resulting in an issue of raising difference in work speeds.

Also, with the second related art optical fiber axial alignment and fusion splicing device, due to the need for the optical fibers to be manually positioned when inserting the optical fibers through the slits, a troublesome issue is encountered. Moreover, since the slits are fixed in position, when inserting the optical fibers or removing the optical fibers, if the optical fibers are not moved in a parallel direction, it is highly probable for the optical fibers to be damaged or broken away. For this reason, the worker is required to carry out the work with an extremely high attention and a poor efficiency results in, with a resultant issue arising in a need for worker's skills.

The present invention has been completed with a view to addressing the above issues and has an object to provide an optical fiber axial alignment method and related device wherein one pair of or plural pairs of opposing optical fibers are automatically received in butt alignment grooves of the butt alignment section and axially aligned with respect to one another, and an optical fiber fusion splicing method and related device wherein the optical fibers, that are axially aligned, are mutually fusion spliced.

SUMMARY OF THE INVENTION

A first aspect of the present invention is a method of axially aligning at least one pair of opposing optical fibers composed of bare optical fibers, optical fiber strands, unit cores or plural cores of optical fiber core wires, and tape shaped optical fiber core wires, the method comprising: locating optical fiber guide sections, each having at least one guide groove to guide an optical fiber, on both sides of a butt alignment section having a pair of or plural pairs of butt alignment grooves separately formed apart from one another with a given distance in an opposing relationship on a substantially straight line; shifting the optical fiber guide sections at the both sides upward above the butt alignment section and guiding the optical fibers in the guide grooves of the optical fiber guide sections at the both sides under a condition in that distal ends of the optical fibers protrude at least in length to reach the butt alignment grooves of the butt alignment section; and lowering the optical fiber guide sections at the both sides to areas below the butt alignment section to allow the-optical fibers to be received in the opposing butt alignment grooves of the butt alignment section and axially aligning the optical fibers with respect to one another.

A second aspect of the present invention is an optical fiber axial alignment device for axially aligning at least one pair of opposing optical fibers composed of bare optical fibers, optical fiber strands, unit cores or plural cores of optical fiber core wires, and tape shaped optical fiber core wires, the optical fiber axial alignment device comprising: a butt alignment section having at least one pair of butt alignment grooves formed apart from one another with a given distance in an opposing relationship on a substantially straight line; and optical fiber guide sections, each having at least one pair of guide grooves, and disposed on both sides of the butt alignment section to be moveable in a vertical direction.

DETAILED DESCRIPTION OF THE INVENTION

Hereinafter, embodiments of the present invention are described with reference to the accompanying drawings. In the present invention, optical fibers generally cover and are referred to bare optical fibers, optical fiber strands, optical fiber cores (in the form of a unit core or multiple cores) and tape type optical fiber cores (composed of a plurality of unit core optical fibers)

Figure 4:
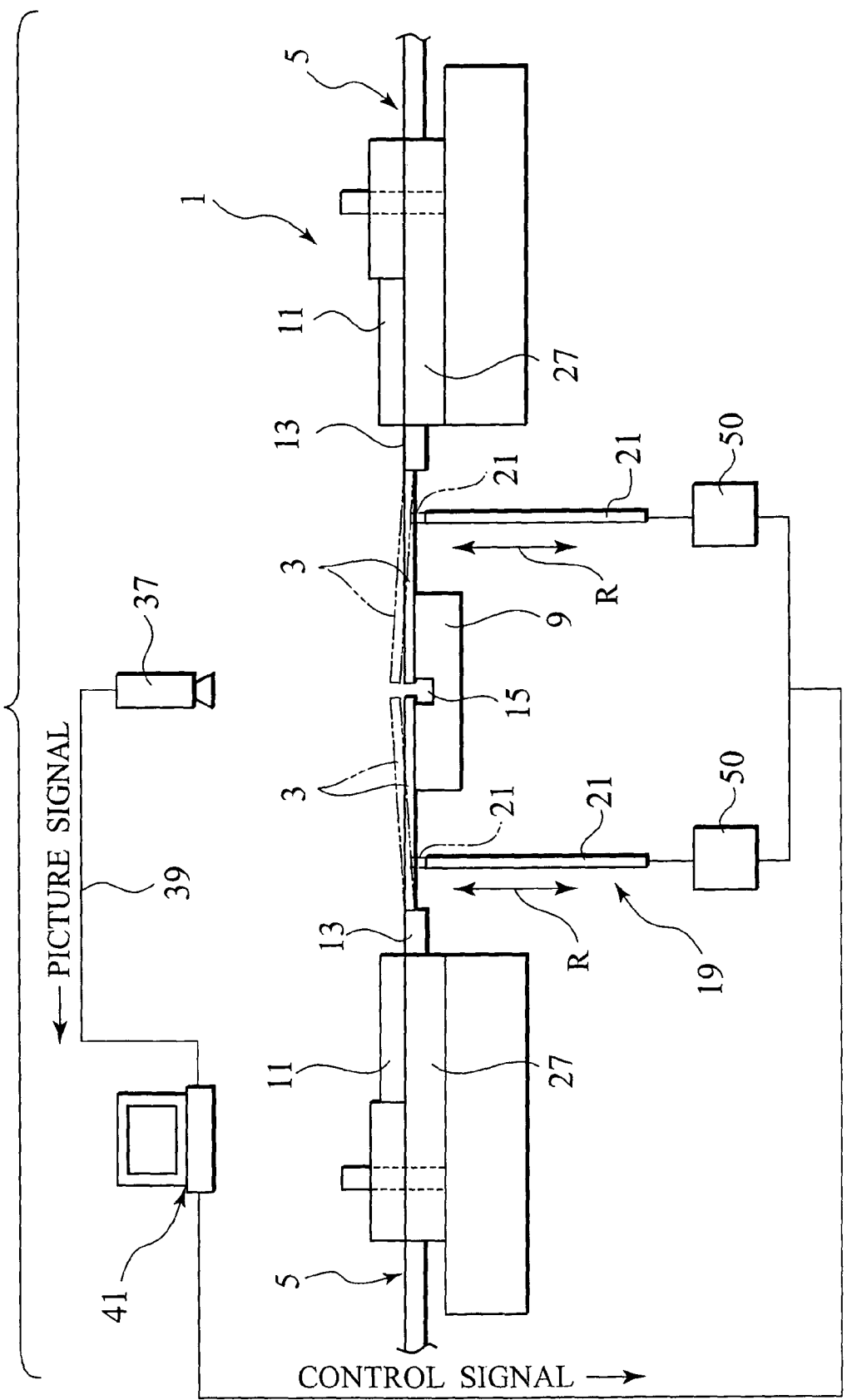
FIG. 4 is a schematic side view of an optical fiber fusion splicing device equipped with an optical fiber alignment device of a first embodiment according to the present invention.
Figure 5:
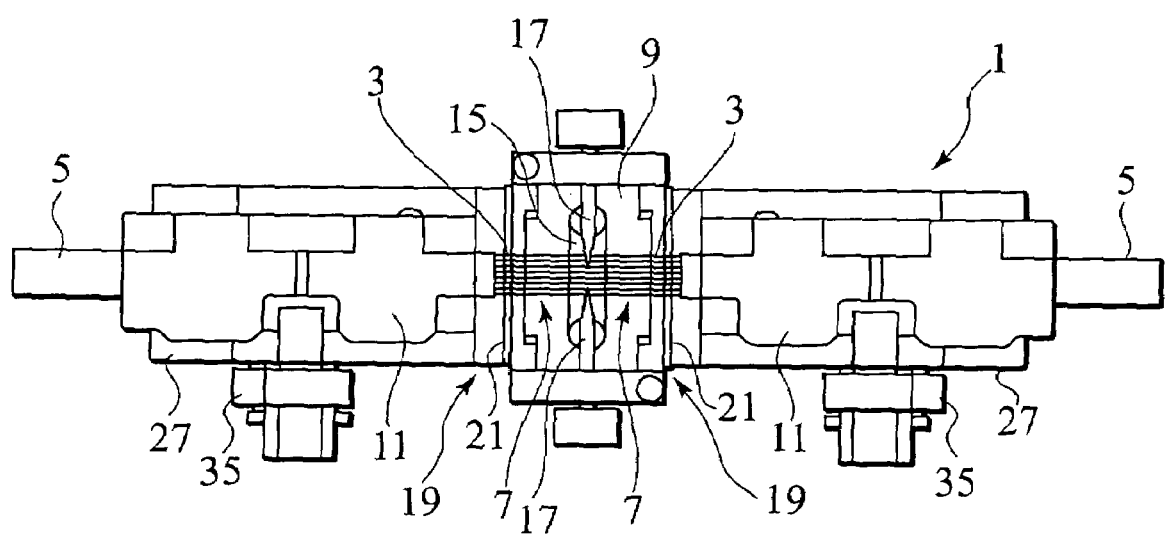
FIG. 5 is a schematic plan view of the optical fiber fusion splicing device equipped with the optical fiber alignment device of the first embodiment according to the present invention.
Figure 6:
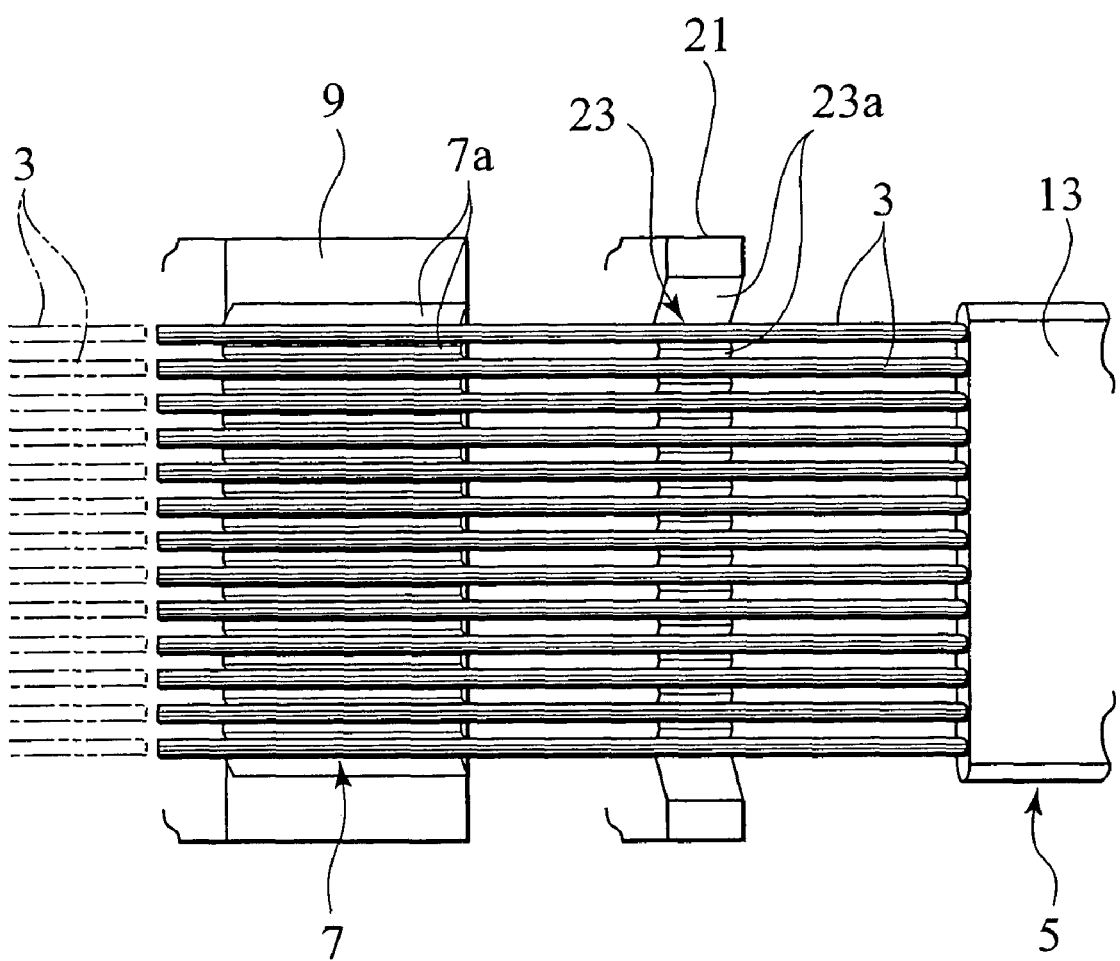
FIG. 6 is a partial perspective view of the optical fiber fusion splicing device equipped with the optical fiber alignment device of the first embodiment according to the present invention.

As shown in FIGS. 4, 5 and 6, an optical fiber fusion splicing device 1 of the presently filed embodiment is comprised of a butt alignment section 9 having butt alignment groove sections 7(shown in FIGS. 5, 6), each of which when aligning a pair of tape core wires 5 each composed of a plurality of bare fibers 3, allows opposing ends of the bare optical fibers 3 to be mutually brought into abutting engagement with respect to one another from right and left sides of the fusion splicing device 1, and optical fiber holder sections 11 (optical fiber holders) to allow the pair of tape core wires 5 to be positioned at both sides of the butt alignment section 9 to be held in position, respectively. Also, the butt alignment groove section 7 includes at least one groove 7a (shown in FIG. 6).

Further, each of the tape core wires 5 is constructed of the plurality of bare optical fibers 3 placed parallel to one another and sheathed by a sheath material 13, such as plastic resin, in a tape form. In the presently filed embodiment, although the tape core wires 5 are used as concrete examples of the optical fibers, it is not objectionable for the optical fiber to be formed of the optical fiber unit core. Also, in the presently filed embodiment, the sheath material 13 is removed from a distal end of the tape core wire 5 to allow the bare optical fibers 3 to be bared. Hereinafter, respective bare optical fibers 3 are simply referred to as "optical fibers 3".

Figure 7:
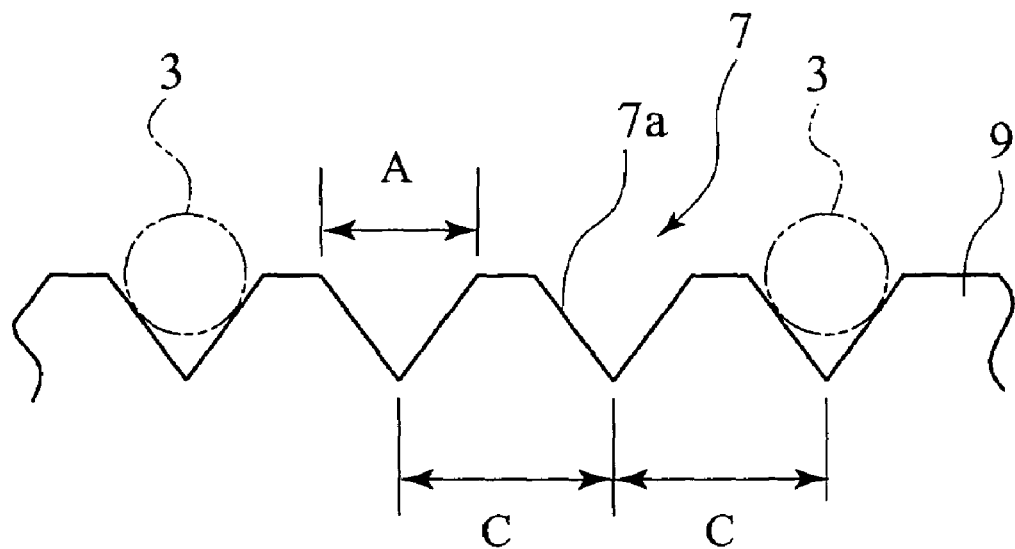
FIG. 7 is a partial front view illustrating shapes of butt alignment grooves of a butt alignment section.

The above-described butt alignment section 9 has a substantially rectangular shape and, as shown in FIGS. 5 and 6, has a lateral groove 15, extending in a widthwise direction (in a vertical direction in FIG. 5) formed at a substantially center of a length wise direction. Plural grooves 7a of the butt alignment groove sections 7 are formed on upper surfaces of a block at both sides of the lateral groove 15 so as to extend in a fore and aft direction (in a left and right direction in FIG. 5) to accommodate and position the optical fibers 3 of the above-described tape core wires 5 (see FIGS. 6 and 7). Also, the mutually opposing plural groove sections 7 allow centers of the respective optical fibers 3 to be positioned in straight lines when the optical fibers 3 are accommodated in the respective grooves 7a.

Further, optical fiber fusion means 17 are mounted on both sides of the lateral groove 15 at upper and lower positions thereof in FIG. 5 to fusion splice the optical fibers 3, that are mutually butted in the butt alignment section 9, with respect to one another.

Further, optical fiber alignment units 19 are examples, that form essential parts of the presently filed embodiment, of the optical fiber axial alignment device. As shown in FIGS. 4 to 6, the optical fiber alignment units 19 are mounted for elevating capabilities between the optical fiber holder sections 11 and the butt alignment section 9 so as to allow plate-like optical fiber guide sections 21 to protrude above the position of the butt alignment groove portions 7 of the butt alignment section 9. That is, the optical fiber guide sections 21 have elevating capabilities in directions R as shown by arrows in FIG. 4.

Figure 8:
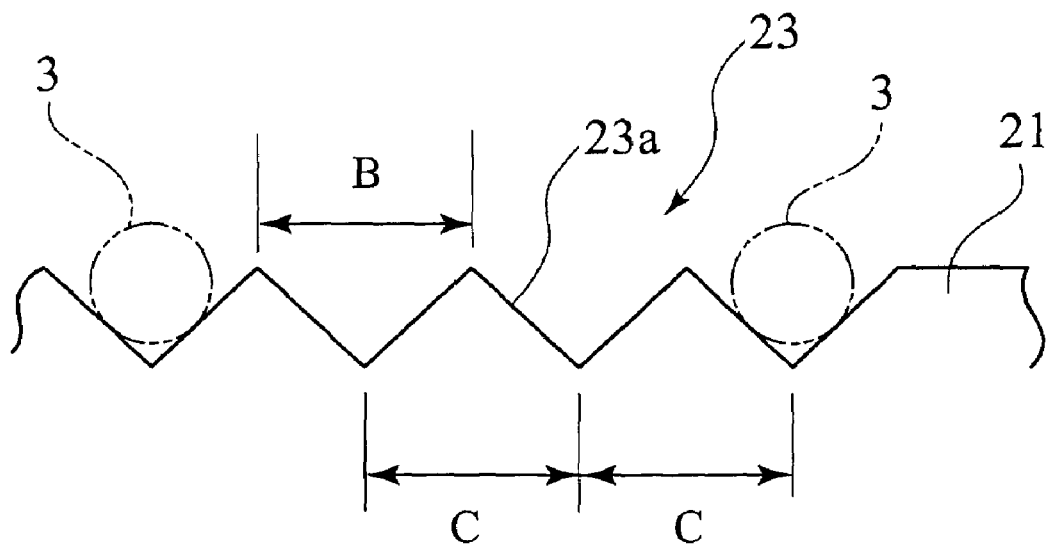
FIG. 8 is a partial front view illustrating shapes of guide grooves of an optical fiber guide section.

Also, as shown in FIG. 8, an upper portion of the optical fiber guide section 21 is formed with a guide groove portion 23 and grooves 23a. The guide groove portion 23 is structured such that, when the optical fibers 3 are placed on the associated grooves 23a, the centers of the optical fibers 3 are aligned on the straight lines connecting the centers of optical fibers 3 placed on the grooves 7a of the butt alignment groove portions 7 shown in FIG. 7. For this reason, each of the butt alignment groove portions 7 has the same pitch, i.e., in the same dimension C, as that of each guide groove portion 23. Also, it is preferred that, in view of a further reliability in aligning the respective optical fibers 3, an opening portion of each guide groove 23a has a size (a groove width B) greater (wider) than a size (a groove width A (see FIG. 7)) of an opening portion of each groove 7a of the butt alignment groove portions 7.

Figure 9:
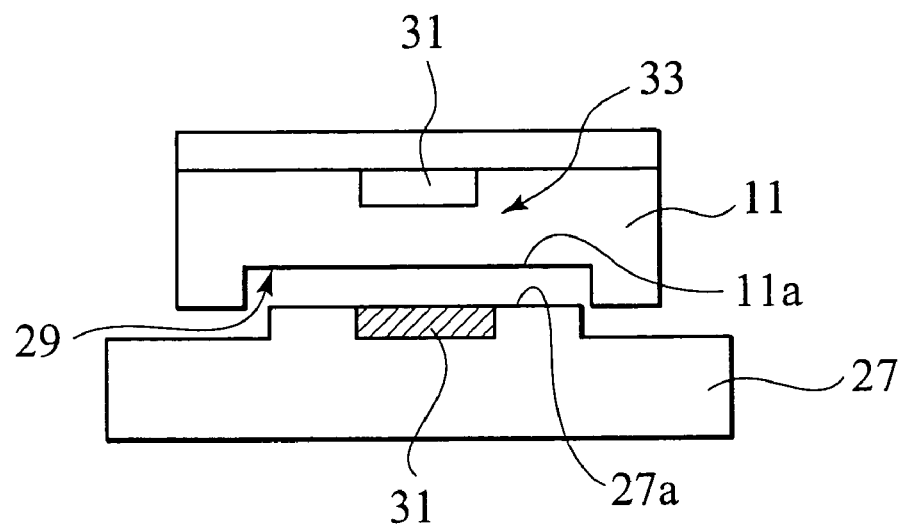
FIG. 9 is a front view of an optical fiber holder section.

Referring to FIG. 9, a bottom wall 11a of the optical fiber holder section 11 has a concave shape, and an upper surface 27a, that serves as a surface on which the optical fiber holder section 11 is rested, of a holder section pedestal 27 has a convex shape. The concave shape of the optical fiber holder section 11 defines a holder guide groove 29 that has the substantially same width as that of the tape core wire 5(not shown in FIG. 9) such that the optical fiber, i.e., the tape core wire 5 is precisely positioned at a given position.

Further, it is preferred that the concave shape of the optical fiber holder section 11 and the convex shape of the holder pedestal 27 are brought into mating engagement with no clearance to allow the tape core wire 5 to be precisely clamped in upward and downward directions. For example, mounting two magnets 31, 31 on the optical fiber holder section 11 and the holder pedestal 27, respectively, to allow these components to attract each other provides a core urging mechanism 33 (a core urging means) to cause the concave portion of the optical fiber holder section 11 to be attracted by the convex portion of the holder section pedestal 27.

Figure 1:
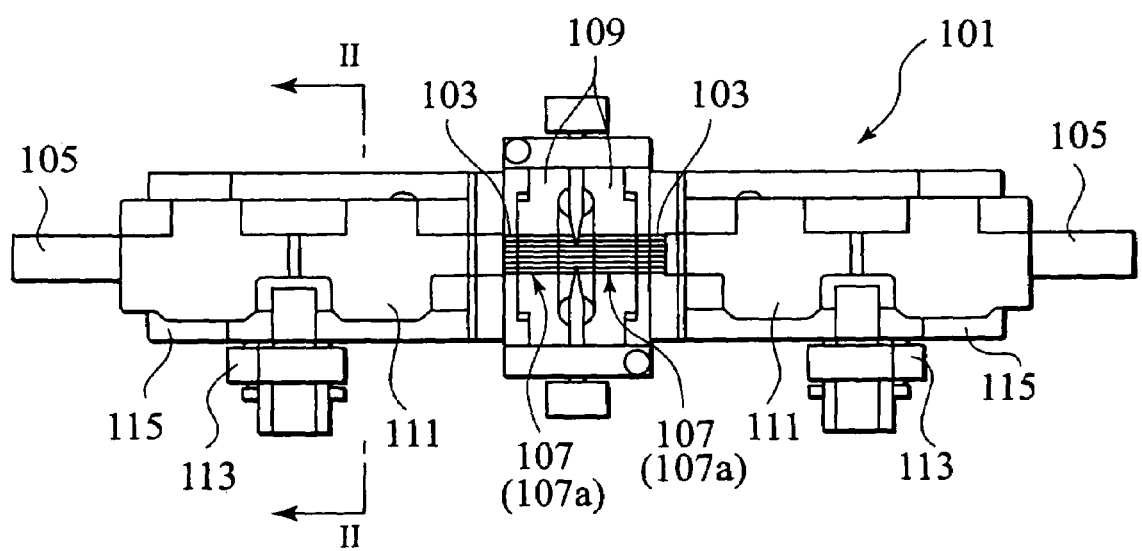
FIG. 1 is a plan view of a related art optical fiber fusion splicing device.
Figure 2:
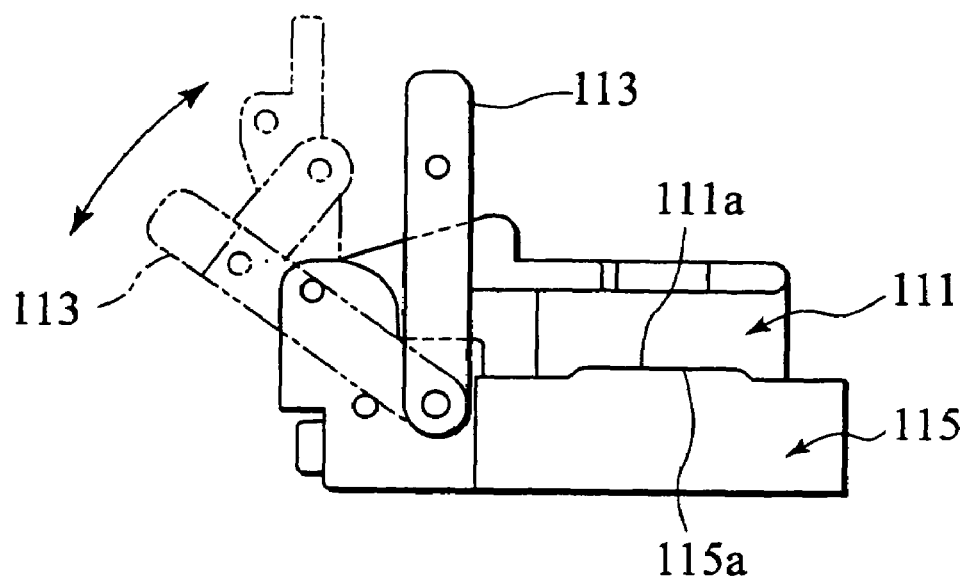
FIG. 2 is a side view of an optical fiber holder section on line II—II of FIG. 1.
Figure 3:
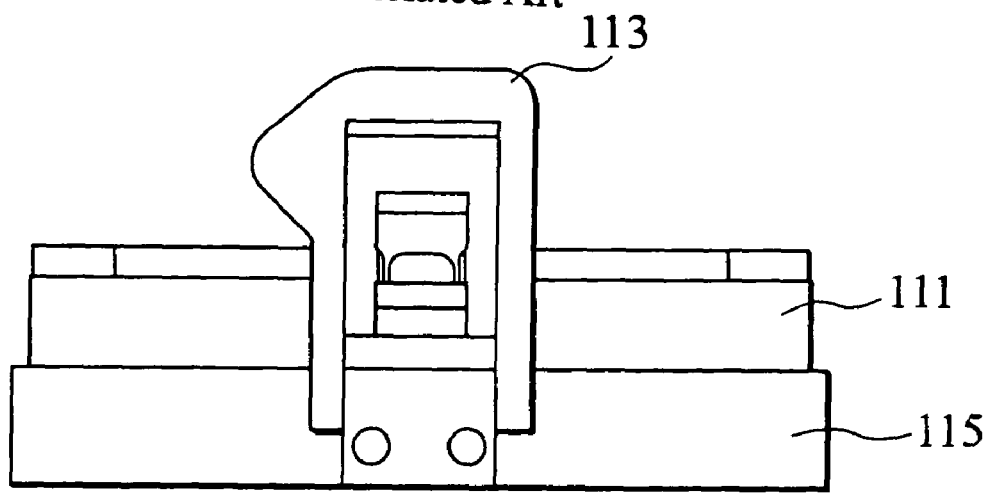
FIG. 3 is a left side view of the optical fiber holder section of FIG. 2.

Also, a mechanism that allows the optical fiber holder section 11 to be held by the holder section pedestal 27 is similar to that shown in FIGS. 2 and 3 as previously set forth above. That is, as shown in FIG. 5, operating clamp levers 35 allows the optical fiber holder section 11 to urge the holder section pedestal 27 such that the optical fiber is held between these components.

As shown in FIG. 4, the optical fiber alignment device 19 is configured such that an image pick up means (such as a CCD camera 37) for picking up an aligned status of the optical fibers 3 on the butt alignment groove portions (shown in FIGS. 5, 6) of the butt alignment section 9 is vertically located above the butt alignment groove portions of the butt alignment section 9. A picture signal detected by the CCD camera 37 is transmitted to an image analyzer unit 41 (computer) through a camera cable 39. The image analyzer unit 41 performs image processing for judging an acceptability of the aligned status of the optical fibers 3 on the butt alignment groove portions.

With the above structure, the respective tape core wires 5 are positioned by the optical fiber holder section 11 to cause the distal ends of the optical fibers 3 of the pair of tape core wires 5 to be mutually butted. Additionally, since the tape core wire 5 is vertically held in pressured contact with between the bottom wall 11a of the holder section 11 and the upper surface 27a of the pedestal 27, the tape core wire 5 is tightly held between the bottom wall 11a and the upper surface 27a of the pedestal 27 and precisely positioned in the lengthwise direction.

Figure 10:
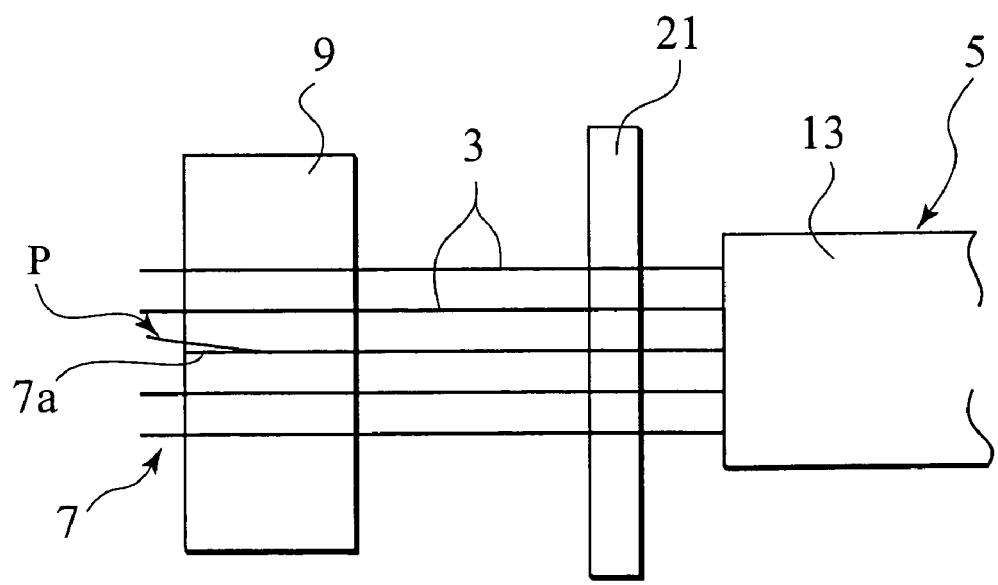
FIG. 10 is a schematic illustrative view showing how the optical fibers of a tape core wire are aligned.

When permitting the optical fiber holder section 111 to hold the optical fiber, as shown at P in FIG. 10, even if the distal end of the optical fiber 3 is deviated from the associated groove 7a of the butt alignment groove portion 7 of the butt alignment section 9, the optical fiber guide section 21 is elevated to lift the relevant optical fiber 3 once whereby the relevant optical fiber 3 is easily aligned in the associated guide groove 23a of the guide groove portion 23 of the optical fiber guide section 21. Subsequently, lowering the optical fiber guide section 21 with the relevant optical fiber 3 in such an aligned position allows the distal end of the relevant optical fiber 3 to be automatically and reliably received in the associated groove 7a of the butt alignment groove portion 7. For this reason, the distal ends of the optical fibers 3 of the pair of tape core wires 5 are coaxially aligned in a mutually butting engagement. Thereafter, the butted optical fibers 3 are fusion spliced by the fusion splicing means 17.

Further, as set forth above, when a pair of or plural pairs of optical fibers are coaxially aligned with respect to one another in an opposing relationship, the aligned status of the optical fibers 3 on the respective grooves 7a of the butt alignment groove portion 7 is detected by the CCD camera 37. The picture signal of the CCD camera 37 is transmitted to the image analyzer unit 41 via the camera cable 39 and, as a result of the received picture signal being analyzed by the image analyzer unit 41, if it is detected that the aligned status of the optical fibers 3 does not satisfy a given condition, that is, when the optical fibers 3 are not properly placed in the associated grooves 7a, a driver section 50 for driving the optical fiber guide section 21 automatically elevates the optical fiber guide section 21 to a position above the butt alignment section 9 in response to the control signal from the image analyzer unit 41, thereby causing the respective optical fibers 3 to be guided in the respective grooves 23a of the guide groove portion 23 of the optical fiber guide section 21. Also, while in the present drawings, two driver sections in compliance with the number of pieces of the optical fiber guide sections 21 have been shown, a single driver section or other embodiments may be configured so as to achieve similar control.

Subsequently, the optical fiber guide section 21 is lowered, and the respective optical fibers 3 are received in the grooves 7a of the opposing butt alignment groove portions 7 of the butt alignment section 9, respectively, to axially aligned. As set forth above, since axial alignment operation is repetitively performed until the aligned status of the optical fibers 3 satisfy the given condition, the optical fibers 3 are brought into alignment in the respectively associated grooves 7a of the given butt alignment groove portions 7 in a further reliable and easy fashion.

Next, another optical fiber butting and axial alignment method separate from the above example is described. However, the optical fiber fusion splicing device 1 has the same structure as that of the embodiment set forth above, and a detail of the same component parts is omitted.

When butting the optical fibers in a manner as set forth above, while the optical fiber guide sections 21 are preliminarily lowered whereupon, after a pair of tape core wires 5 are clamped by the optical fiber holder section 11, the optical fiber guide sections 21 are elevated to raise the optical fibers 3 once for alignment and, then, the optical fiber guide sections 21 are lowered to allow the distal ends of the optical fibers 3 to be received in the respective grooves 7a of the butt alignment groove portions 7, another method may be carried out to obtain the same advantageous effects as those set forth above with a structure wherein the optical fiber guide sections 21 are caused to be elevated to respective positions higher than the butt alignment groove portions 7 from an initial stage whereupon a pair of tape core wires 5 are clamped by the optical fiber holder section 11 to allow the respective optical fibers 3 to be placed and aligned in the guide grooves 23 of the optical fiber guide sections 21 and, subsequently, the optical fiber guide sections 21 are lowered.

Further, while positions of the optical fiber guide sections 21 in the fore and aft direction (the right and left direction as viewed in FIG. 4) lie in substantially intermediate positions between the butt alignment sections 9 and the optical fiber holder sections 11 as shown in FIG. 4, the optical fiber guide sections 21 may be placed near the sheaths of the optical fibers 3 as close as possible such that, even if the distal ends of the optical fibers 3 are widened or subjected to bending at a alight degree, the optical fibers 3 has relatively less spreading or bending at areas in the vicinities of the covered sheath materials 13. Thus, by making the optical fibers 3 to be brought into alignment with the guide groove portions 23(shown in FIG. 6) of the optical fiber guide section 21 that is elevated once, the spreading and bending of the optical fibers may corrected. Thereafter, lowering the optical fiber guide sections 21 while maintaining the optical fibers 3 in such conditions enables the respective optical fibers 3 to be received in the associated grooves 7a of the butt alignment groove portions 7 (shown in FIG. 7).

Figure 11A:
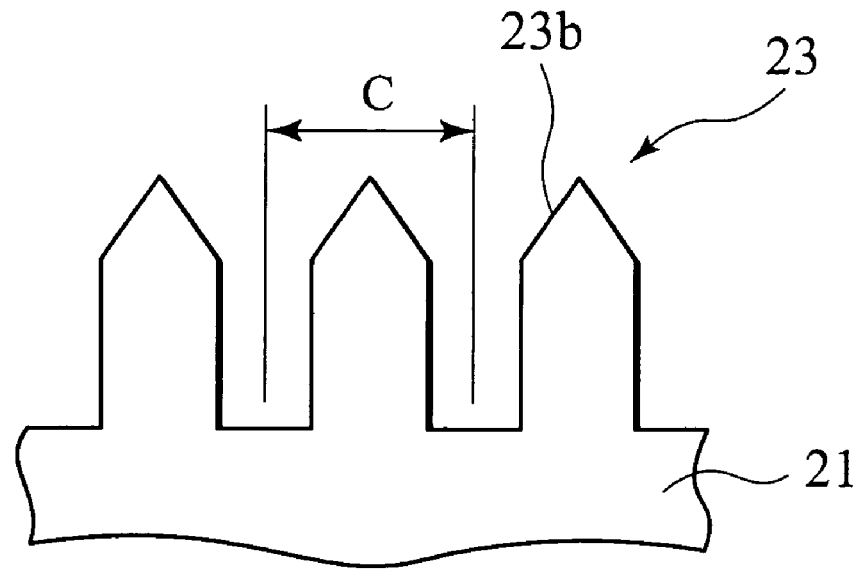
FIGS. 11A, 11B are a schematic front view illustrating shapes of other guide grooves in the optical fiber guide section.
Figure 11B:
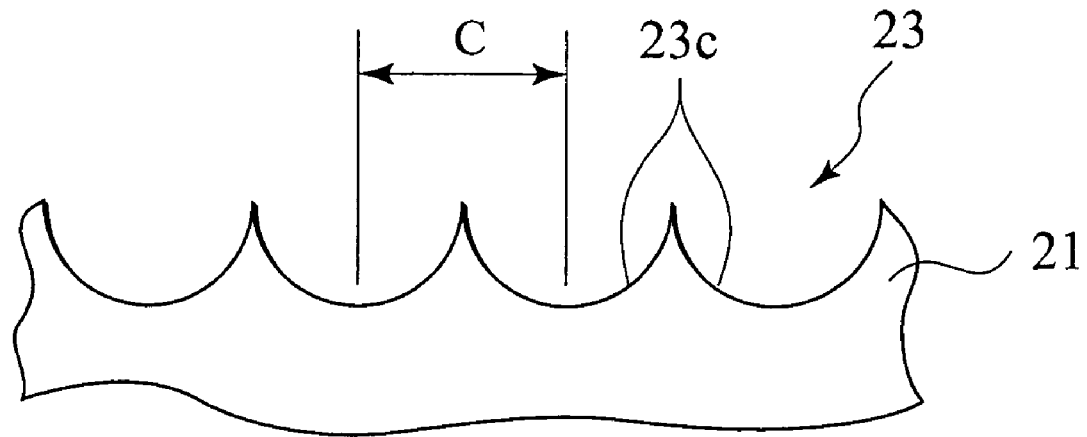

Also, although each groove 23a of the guide groove portion 23 is shown to have a V-shape (the groove 23a shown in FIG. 8) in the embodiment set forth above, the shape of each groove 23a may take the form of configurations such as 23b, 23c shown in FIGS. 11A and 11B or may take any other configurations provided that the pitch C of the adjacent grooves 23a is identical in dimension to the pitch C of the above-described grooves 23a, resulting in a capability of obtaining similar advantageous effects provided that the grooves have shapes to accommodate the optical fibers.

From the foregoing description, since the optical fibers 3, that are deviated from the butt alignment groove portions 7 of the butt alignment section 9, can be automatically received in the given butt alignment groove portions 7 with the optical fiber guide section 21, no positioning work is required for a worker while permitting work to be done at a constant speed with no dependence on the worker's skills.

Further, if the respective optical fibers 3 are deviated from the associated grooves 7a under the condition in which the tape core wires 5 are clamped by the optical fiber holder sections 11, in a subsequent stage, the respective optical fibers 3 are automatically and easily aligned by the optical fiber guide sections 21.

Furthermore, due to an ability of the optical fiber guide sections movable in the elevated and lowered positions to allow the optical fibers 3 to be automatically aligned after the optical fibers 3 have been set by the optical fiber holder section 11, no troublesome work is required for preliminarily positioning the optical fibers 3 in the associates slits as required in the related art practice, and the optical fibers can be efficiently positioned in a given position.

Moreover, when setting the tape core wires 5 in the optical fiber holder section 11 or removing the optical fibers from the same, since the optical fiber guide sections 21 are lowered to the respective positions below the butt alignment groove portions 7 of the butt alignment section 9, no happening occurs to damage or break the optical fibers 3 as experienced in the related art practice even when the worker does not concentrate attention.

Also, the present invention is not limited to the embodiment set forth above and may take suitable modification to be carried out in other embodiments. While in the optical fiber axial alignment device 19 and the fusion splicing device 1, one piece of optical fiber guide section 21 is located at each of both sides of the butt alignment section 9, it is not objectionable for plural pieces of optical fiber guide sections 21 may be located on both sides of the butt alignment section 9 in a given distance with respect to one another in another embodiment. In such case, the plural pieces of the optical fiber guide sections 21 serve to allow the respective optical fibers 3 to be received in the associated guide groove portions 23 in a further reliable fashion.

The entire content of a Japanese Patent Application No. P2002-295120 with a filing date of Oct. 8, 2002 and No. P2003-55753 with a filing date of Mar. 3, 2003 is herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. A method of axially aligning at least one pair of opposing optical fibers composed of bare optical fibers, optical fiber strands, unit cores or plural cores of optical fiber core wires, and tape shaped optical fiber core wires, the method comprising:
    locating optical fiber guide sections, each having at least one guide groove to guide an optical fiber, on both sides of a butt alignment section having a pair of or plural pairs of butt alignment grooves separately formed apart from one another with a given distance in an opposing relationship on a substantially straight line;
    shifting the optical fiber guide sections at the both sides upward above the butt alignment section and guiding the optical fibers in the guide grooves of the optical fiber guide sections at the both sides under a condition in that distal ends of the optical fibers protrude at least in length to reach the butt alignment grooves of the butt alignment section; and
    lowering the optical fiber guide sections at the both sides to areas below the butt alignment section to allow the optical fibers to be received in the opposing butt alignment grooves of the butt alignment section and axially aligning the optical fibers with respect to one another.

2. The method of axially aligning optical fibers according to claim 1, wherein
    the optical fiber guide sections are elevated from a lower position than the butt alignment section to a position higher than the same to guide the optical fibers in the guide grooves of the optical guide sections; and
    the optical fiber guide sections are lowered to allow the optical fibers to be received in the opposing butt alignment grooves of the butt alignment section, respectively, for axial alignment.

3. The method of axially aligning optical fibers according to claim 1, wherein
    before the optical fibers are placed on the optical fiber guide sections, sheaths of ends of the optical fibers are removed to be bared to allow the ends of the optical fibers to be received in the guide grooves of the optical fiber guide sections and the butt alignment grooves of the butt alignment section.

4. The method of axially aligning optical fibers according to claim 1, further comprising:
    before placing the optical fibers on the optical fiber guide sections, clamping the optical fibers on optical fiber holder sections mounted at the both sides of the optical fiber guide sections.

5. The method of axially aligning optical fibers according to claim 1, wherein the optical fiber guide sections are located at positions on substantially the same extension lines connecting at least one pair of the butt alignment grooves formed on the butt alignment section.

6. The method of axially aligning optical fibers according to claim 1, wherein the guide groove has an opening portion that is wider than the butt alignment groove of the butt alignment section.

7. The method of axially aligning optical fibers according to claim 1, wherein plural pieces of the optical guide sections are located on the both sides of the butt alignment section, respectively, and spaced apart from the same with a given distance.

8. The method of axially aligning optical fibers according to claim 1, further comprising:
    during the axially aligning, detecting an alignment status of the optical fiber on the butt alignment grooves with image pick up means such that, when the optical fibers are out of axial alignment, automatically elevating the optical guide section to a position higher than the butt alignment section again to allow the optical fibers to be guided in the guide grooves of the optical fiber guide sections; and lowering the optical fiber guide section to allow the optical fibers to be received in the opposing butt alignment grooves of the butt alignment section, respectively, to be aligned.

9. An optical fiber axial alignment device for axially aligning at least one pair of opposing optical fibers composed of bare optical fibers, optical fiber strands, unit cores or plural cores of optical fiber core wires, and tape shaped optical fiber core wires, the optical fiber axial alignment device comprising:

a butt alignment section having at least one pair of butt alignment grooves formed apart from one another with a given distance in an opposing relationship on a substantially straight line;

optical fiber guide sections, each having at least one pair of guide grooves, and disposed on both sides of the butt alignment section, to be moveable upward above and downward below the butt alignment section; and optical fiber holder sections, configured to hold at least one pair of the optical fibers, located so as to interpose the butt alignment section and the optical fiber guide sections therebetween.

10. The optical fiber axial alignment device according to claim 9, wherein the optical fiber guide section comprises at least one guide groove placed on substantially the same extension line that connects at least one pair of the butt alignment grooves formed on the butt alignment section.

11. The optical fiber axial alignment device according to claim 9, wherein the guide groove has an opening portion that is wider than the butt alignment groove of the butt alignment section.

12. The optical fiber axial alignment device according to claim 9, wherein plural pieces of the optical fiber guide sections are located on the both sides of the butt alignment section and separated from the same with given distances, respectively.

13. The optical fiber axial alignment device according to claim 9, further comprising:

image pick up means for detecting an aligned status of the optical fibers on the butt alignment grooves to produce a picture signal.

14. A method of mutually fusion splicing at least one pair of opposing optical fibers composed of bare optical fibers, optical fiber strands, unit cores or plural cores of optical fiber core wires, and tape shaped optical fiber core wires, the method comprising:

locating optical fiber guide sections, each having at least one guide groove, on both sides of a butt alignment section that has at least one pair of butt alignment grooves formed on a substantially straight line in an opposing relationship and separated from one another with a given distance;

guiding the optical fibers, under a condition wherein the optical fibers are located above the butt alignment section, so as to allow ends of bared portions, in which sheaths of the optical fibers are removed, of the optical fibers to protrude in the guide grooves of the optical guide sections at least in lengths to permit the ends of the bared portions to reach the butt alignment grooves of the butt alignment section;

lowering the optical fiber sections to positions below the butt alignment section to allow bared portions of the optical fibers to be received in the opposing butt alignment grooves of the butt alignment section, respectively, and axially aligning the bared portions with respect to one another; and fusion splicing the opposing optical fibers with respect to one another.

15. The method of mutually fusion splicing the optical fibers according to claim 14, wherein the optical fiber guide sections are elevated from a lower position than the butt alignment section to a higher position than the same, and the bared portions, in which the sheaths of the optical fibers are removed, of the optical fibers are guided in the guide grooves of the optical guide sections; and the optical fiber guide sections are lowered to allow the bared portions of the optical fibers to be received in the opposing butt alignment grooves of the butt alignment section, respectively, and axially aligning the bared portions with respect to one another.

16. The method of mutually fusion splicing the optical fibers according to claim 14, wherein the optical fibers are clamped by optical fiber holder sections located on both sides of the optical fiber guide sections.

17. The method of mutually fusion splicing the optical fibers according to claim 14, further comprising during the axially aligning, detecting an aligned status of the optical fiber on the butt alignment grooves with image pick up means and, when the optical fibers are out of the axial alignments, automatically elevating the optical fiber guide section to a position higher than the butt alignment section again to allow the optical fibers to be guided in the guide grooves of the optical guide section; and lowering the optical fiber guide section to allow the optical fibers to be received in the opposing butt alignment grooves of the butt alignment section, respectively, to be axially aligned.

18. An optical fiber fusion splicing device for mutually fusion splicing at least one pair of opposing optical fibers composed of bare optical fibers, optical fiber strands, unit cores or plural cores of optical fiber core wires, and tape shaped optical fiber core wires, the optical fiber axial alignment device comprising:

a butt alignment section having at least one pair of butt alignment grooves formed apart from one another with a given distance in an opposing relationship on a substantially straight line;

optical fiber guide sections, each having at least one guide groove, and located on both sides of the butt alignment section, to be moveable upward above and downward below the butt alignment section; and optical fiber holder sections, for holding the optical fibers, located so as to interpose the butt alignment section and the optical fiber guide sections therebetween.

19. The optical fiber fusion splicing device according to claim 18, wherein the optical fiber guide section comprises at least one guide groove placed on substantially the same extension line that connects the at least one pair of opposing butt alignment grooves formed on the butt alignment section.

20. The optical fiber fusion splicing device according to claim 18, wherein the guide groove has an opening portion that is wider than the butt alignment groove of the butt alignment section.

21. The optical fiber fusion splicing device according to claim 18, wherein plural pieces of the optical fiber guide sections are located on the both sides of the butt alignment section to be apart from the same with given distances, respectively.

22. The optical fiber fusion splicing device according to claim 18, further comprising:

image pick up means for detecting an aligned status of the optical fibers on the butt alignment grooves to produce a picture signal.

* * * * *